(12) United States Patent
Janus et al.

(10) Patent No.: US 6,445,865 B1
(45) Date of Patent: Sep. 3, 2002

(54) OPTICAL FIBER JUMPER CABLE BEND LIMITER AND HOUSING THEREFOR

(75) Inventors: Neal A. Janus, Parsippany; Anthony Pellegrino, Gladstone; Randy Alan Reagan, Morris Plains, all of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/676,176

(22) Filed: Sep. 29, 2000

(51) Int. Cl.[7] ............................. G02B 6/00; G02B 6/36
(52) U.S. Cl. ......................... 385/135; 385/134; 174/59
(58) Field of Search ............................... 385/133–140; 174/59, 60, 61, 62, 63, 64

(56) References Cited

U.S. PATENT DOCUMENTS

| | | | | |
|---|---|---|---|---|
| 5,945,633 A | * | 8/1999 | Ott et al. | 174/59 |
| 6,250,816 B1 | * | 6/2001 | Johnston et al. | 385/53 |
| 6,263,136 B1 | * | 7/2001 | Jennings et al. | 385/48 |
| 6,271,476 B1 | * | 8/2001 | Bobowick et al. | 174/135 |
| 2001/0031124 A1 | * | 10/2001 | McGrath et al. | 385/134 |

* cited by examiner

*Primary Examiner*—Brian Sircus
*Assistant Examiner*—Michael C. Zarroli

(57) ABSTRACT

A cable jumper bend limiter arrangement for a fiber distribution shelf that is readily adaptable for use in conventional fiber distribution frames. The shelf jumper bend limiter arrangement of the invention operates to maintain minimum bend radii for jumpers routed via the shelf and facilitates increased storage and routing space for jumper cables routed in jumper troughs of distribution frames in which the shelves are installed. Radial guides that form the bend limiters for the distribution shelf of the invention are disposed predominantly within the perimeter of the shelf and extend only minimally beyond an edge of the shelf.

14 Claims, 4 Drawing Sheets

OPTICAL FIBER JUMPER CABLE BEND LIMITER AND HOUSING THEREFOR

FIELD OF THE INVENTION

The present invention relates generally to optical fiber handling systems, and more particularly to an optical fiber bend limiter that provides increased volume for storage of optical fiber jumper cables.

BACKGROUND OF THE INVENTION

Many applications utilize an optical fiber network of interconnected optical fiber cables to enable optical communications between network locations. Optical fiber cable consists of a plurality of optical fibers surrounded by a protective sheath. Individual optical fibers consist of a small diameter core of low-loss material such as glass or plastic surrounded by a protective cladding that has a slightly lower index of refraction than the core. As is well known, fiber optic cable operates to guide transmitted light pulses with small pulse attenuation (i.e., low signal loss).

Due to the fragile nature of the fiber, there is a need to protect the fiber from external sources of stress, such as bending, pressure and strain, that can damage the fiber and/or cause degradation of the signal being transmitted via the fiber. For example, a fiber should not be bent sharply anywhere along its path. In addition to the possibility of breakage or fracture, if a fiber is bent past a critical angle, portions of transmitted light pulses will leak out, rather than being reflected within the fiber core, thereby attenuating the transmitted light pulses and degrading signal quality. Accordingly, it is necessary that a fiber be routed so that bends in the fiber be of a sufficient radius to substantially avoid occurrence of such light leakage.

The radius below which a fiber should not be bent to avoid light ray leakage is characterized as the minimum bend radius. Typically, the minimum bend radius varies with fiber design. However, in all fiber designs, bending the fiber with a radius smaller than its minimum bend radius may result in increased signal attenuation and/or a broken fiber.

Ordinarily, a unique fiber routing will be required to transmit light pulses between network locations. Over this unique route, light pulses may be propagated across several different fibers. At each transition from one fiber to another, individual fibers are connected, thereby enabling light pulses to be carried between a first fiber and a second fiber. In many cases, such as at a central office for the communications system, large numbers of fiber connections must be made and a fiber administration system is employed to manage the various connections.

In many fiber administration systems, as the optical fibers in a network enter the central office, they are directed into an optical distribution frame where the individual optical fibers are terminated in an organized manner. Such fiber administration systems are exemplified by the LGX® fiber administration system that is currently manufactured by Lucent Technologies of Murray Hill, N.J., the assignee herein.

An optical distribution frame may include one or more bays, each such bay being a vertical structure that supports a plurality of different shelves. Among the shelves in the fiber distribution frame are fiber distribution shelves. Located within the fiber distribution shelves are optical connection ports that receive the ends of all of the individual optical fibers that enter the central office for the optical fiber network. The fibers so connected at the distribution shelf ports are then interconnected as needed for a desired routing by fiber jumper cables that can be plugged into optical connectors associated with each optical connection port. In the commonly occurring case where an interconnection is required between a fiber terminated at a port on one shelf with another fiber terminated at a port for a separate shelf, the connecting jumper cable must be routed within the distribution frame between those separate shelves.

As optical fiber distribution systems evolve with growing and/or changing information-handling requirements, there is a need to install, remove, and/or reroute optical fiber jumper cables used for making connections within or among shelves in a distribution frame. However, one of the concerns in the evolution of network distribution systems is the handling and/or storage of these jumpers, and particularly the maintenance of the minimum bend radius for a jumper. A point of special concern in respect to bending of the fiber jumpers is the exit of a jumper from a shelf, typically at one side of the shelf or the other, for routing to another point in the frame. In the present art, bend limiters are attached to jumper ports at each side of a shelf. Because these current-art bend limiters are attached to the outside of the shelf, they protrude into a vertical jumper trough area at either side of the frame, thereby reducing the available space in the trough for storage and routing of jumpers. Moreover, current-art shelf bend limiter arrangements have guides that extend an excess amount below the surface of the shelf. Thus, these shelves cannot be tightly stacked in a conventional frame used in optical fiber communication systems.

Accordingly, there is a need for a new and useful storage and routing arrangement for optical fiber jumper cables that permits the easy removal, addition, and/or re-routing of optical fiber jumper cables.

SUMMARY OF THE INVENTION

In accordance with the present invention, there is provided a novel and useful cable jumper bend limiter arrangement for a fiber distribution shelf that is readily adaptable for use in conventional fiber distribution frames. The shelf jumper bend limiter arrangement of the invention operates to maintain minimum bend radii for jumpers routed via the shelf and facilitates increased storage and routing space for jumper cables routed in jumper troughs of distribution frames in which the shelves are installed.

A fiber distribution shelf is provided having at least one side arranged to be in alignment with a routing trough of the distribution frame when the shelf is installed within the distribution frame and wherein the shelf includes a first radial guide located on the shelf surface adjacent the at least one side and arranged to form a protrusion above the shelf surface, and further wherein the first radial guide is disposed substantially within the perimeter of the shelf and extends only minimally beyond the edge of the at least one side.

In a further embodiment of the invention, the fiber distribution shelf includes a first upper radial guide disposed vertically above and substantially aligned with the first radial guide. The first radial guide and the first upper radial guide cooperatively define a first jumper port for the routing of jumper cables to and from the shelf.

In a still further embodiment of the invention, the fiber distribution shelf includes at least one other side arranged to be in alignment with another routing trough of the distribution frame when the shelf is installed within the distribution frame, and wherein the shelf further includes a second radial guide located on the shelf surface adjacent the at least one other side and arranged to form a protrusion above the shelf surface, and further wherein the second radial guide is disposed substantially within the perimeter of the shelf and extends only minimally beyond the edge of the at least one other side.

In a still further embodiment of the invention, the fiber distribution shelf includes a second upper radial guide disposed vertically above and substantially aligned with the second radial guide. The second radial guide and the second upper radial guide cooperatively define a second jumper port for the routing of jumper cables to and from the shelf.

These and other aspects of the present invention will be better appreciated by reference to the following drawings and Detailed Description.

DETAILED DESCRIPTION OF THE INVENTION

The invention disclosed herein provides a novel and useful optical fiber distribution shelf and housing having an increased volume for storing and handling optical fiber jumper cables relative to the volume available in known optical fiber jumper bend limiter shelves and housings. Consequently, the fiber distribution shelf and housing of the invention accommodates a greater number of fiber jumper cables while preventing bending of optical fibers beyond a minimum bend radius, and permits easy removal, addition, and/or re-routing of those jumpers.

Figure 1:
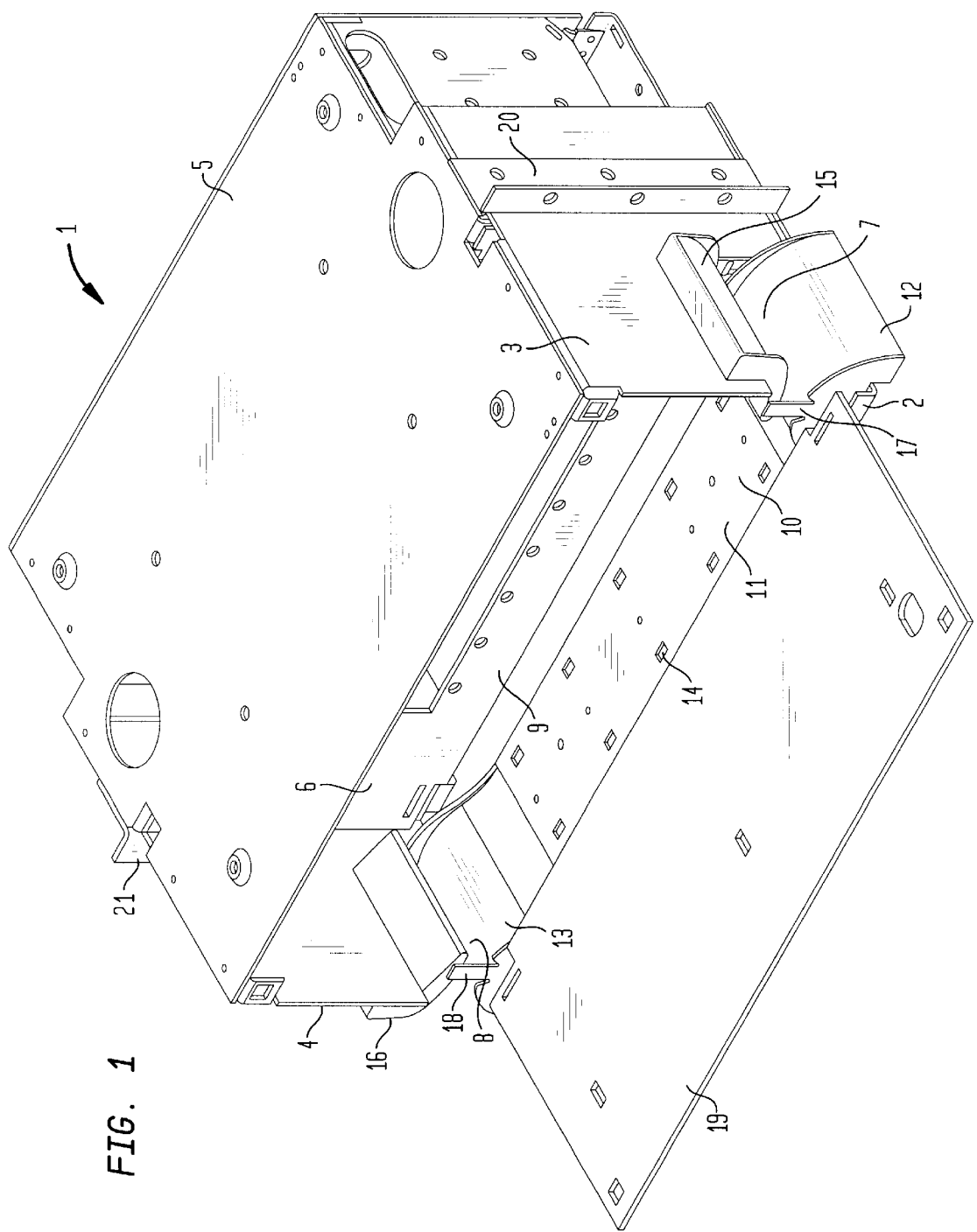
FIG. 1 is a perspective view of a fiber distribution shelf housing of the present invention.

With reference now to FIG. 1, which shows a perspective view of the shelf jumper bend limiter housing of the invention, a housing (I) includes base (2), bulkhead panel (6), and side panels (3) and (4), each of which has a portion removed that eventually forms jumper ports (7) and (8). Base (2) is disposed within the housing such that a first edge thereof intersects an edge of bulkhead panel (6), and the two edges orthogonally disposed relative to the first edge intersect first and second side panels (3) and (4). Bulkhead panel (6) also is adapted to receive a plurality of optical connectors (not shown) into which optical fiber jumpers can be plugged.

The housing (1) also includes top panel (5) approximately parallel to base (2), and similarly having a first edge intersecting an edge of bulkhead panel (6) and the two edges orthogonally disposed relative to that first edge intersecting first and second side panels (3) and (4). As a result of these intersections, chamber (9) is formed, in which optical fiber jumpers may be routed and stored.

A lower bend limiter/ringstand (10) is disposed on a surface of base (2). Lower bend limiter/ringstand (10) comprises a fiber ring mounting surface (11) and left and right radial guides (12) and (13) located on opposite sides of fiber ring mounting surface (11). Optionally, fiber ring mounting surface (11) further comprises a plurality of holes (14) into which fiber rings (not shown) can be fixed to hold and organize optical fiber jumper cables in chamber (9).

Still referring to FIG. 1, left and right radial guides (12) and (13), which are preferably semi-cylindrical in shape, protrude above fiber ring mounting surface (12) in a hump-like fashion. As will be seen in the figure, left and right radial guides (12) and (13) are positioned predominantly within the confines of fiber ring mounting surface (11) (and base (2)), extending beyond the left and right ends of base (2) only to the extent needed to maintain the required bending radius for jumper cables making a 90 degree turn from the lower bend limiter/ringstand (and chamber (9)) to the vertical routing channel of the frame. In a particular embodiment, radial guides (12) and (13) prevent the bending of optical fiber jumpers passing through jumper ports (7) and (8) from exceeding a 38 mm bend limit.

As also shown in FIG. 1, the housing of the invention may also include left and right upper radial guides (15) and (16) attached to side panels (3) and (4) respectively. Left and right upper radial guides (15) and (16) are oppositely disposed from radial guides (12) and (13) and preferably are also of a generally semicircular shape. As with radial guides (12) and (13), upper radial guides (15) and (16) function as bend limiters for jumper cables routed from the lower bend limiter/ringstand (and chamber (9)) into the routing channel of the frame in a vertically upward direction. Each respective pair of a radial guide and an upper radial guide define a jumper port for the shelf jumper bend limiter housing of the invention—radial guide (12) and upper radial guide (15) defining jumper port (7), and jumper port (8) being defined by radial guide (13) and upper radial guide (16).

In a further embodiment, a first (17) and second (18) shoulder may be extended vertically from the "hump" of left radial guide (12) and right radial guide (13), respectively. The first (17) and second (18) shoulders operate to secure jumper cables being routed via jumper ports (7) and (8), respectively within the proper routing channel and to avoid such jumper cables being pinched between an edge of side panels (3) and (4) and front door (19) when it is placed in a position to enclose chamber (9). In a particular embodiment, hinges (not shown) connect front door (19) to base (2), to facilitate convenient opening and closing of chamber (9). In the embodiment shown in FIG. 1, front door (19) is in an open position exposing chamber (9).

In an optional configuration, brackets (20) and (21) can be attached to side panels (3) and (4). Brackets (20) and (21) provide a means for securing housing (1) to a conventional distribution frame.

Figure 2:
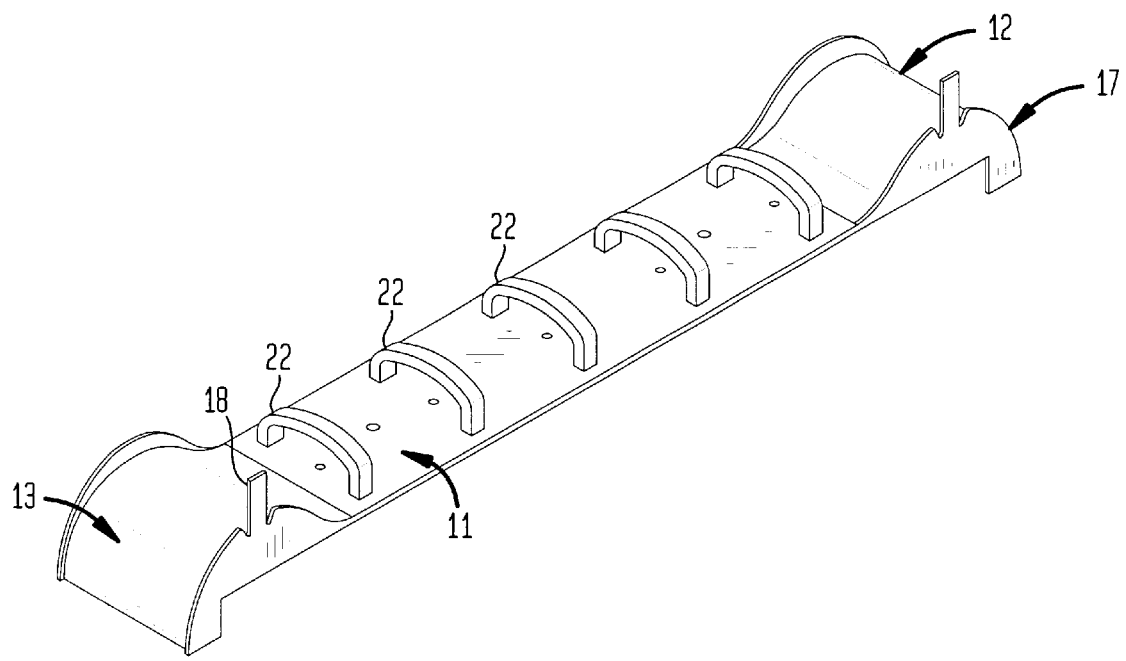
FIG. 2 is a perspective view of a lower bend limiter in accordance with the invention.

FIG. 2 is a perspective depiction of an illustrative embodiment of an upper and lower bend limiter/ringstand implemented according to the invention. In particular, FIG. 2 shows fiber ring mounting surface (11) having a first radial guide (12) at one end, and a second radial guide (13) at the other end. As explained above, radial guides (12) and (13) are preferably semi-cylindrical shape and protrude from fiber ring mounting surface (11) in a hump like fashion. As a result, a minimum bend radius is maintained for jumper cables routed from the shelf via one of the radial guides without the need for a bend-limiter device extending matrially into the vertical cable routing channel of the frame.

Also shown in the depiction of the invention in FIG. 2 are the heretofore described first (17) and second (18) shoulders which operate to secure jumper cables being routed via the associated radial guide within the proper routing channel. As a result, jumpers are controlled within a shelf/jumper port boundary, and the possibility of pinching an optical fiber jumper cable between a front door hinged to base (2), moved to a closed position, and a side panel of the housing of the invention is reduced.

A plurality of fiber rings (22) are shown in FIG. 2 affixed to holes (not shown) in fiber ring mounting surface (II). The fiber rings (22) operate to collect and organize jumpers within chamber (9).

Figure 3:
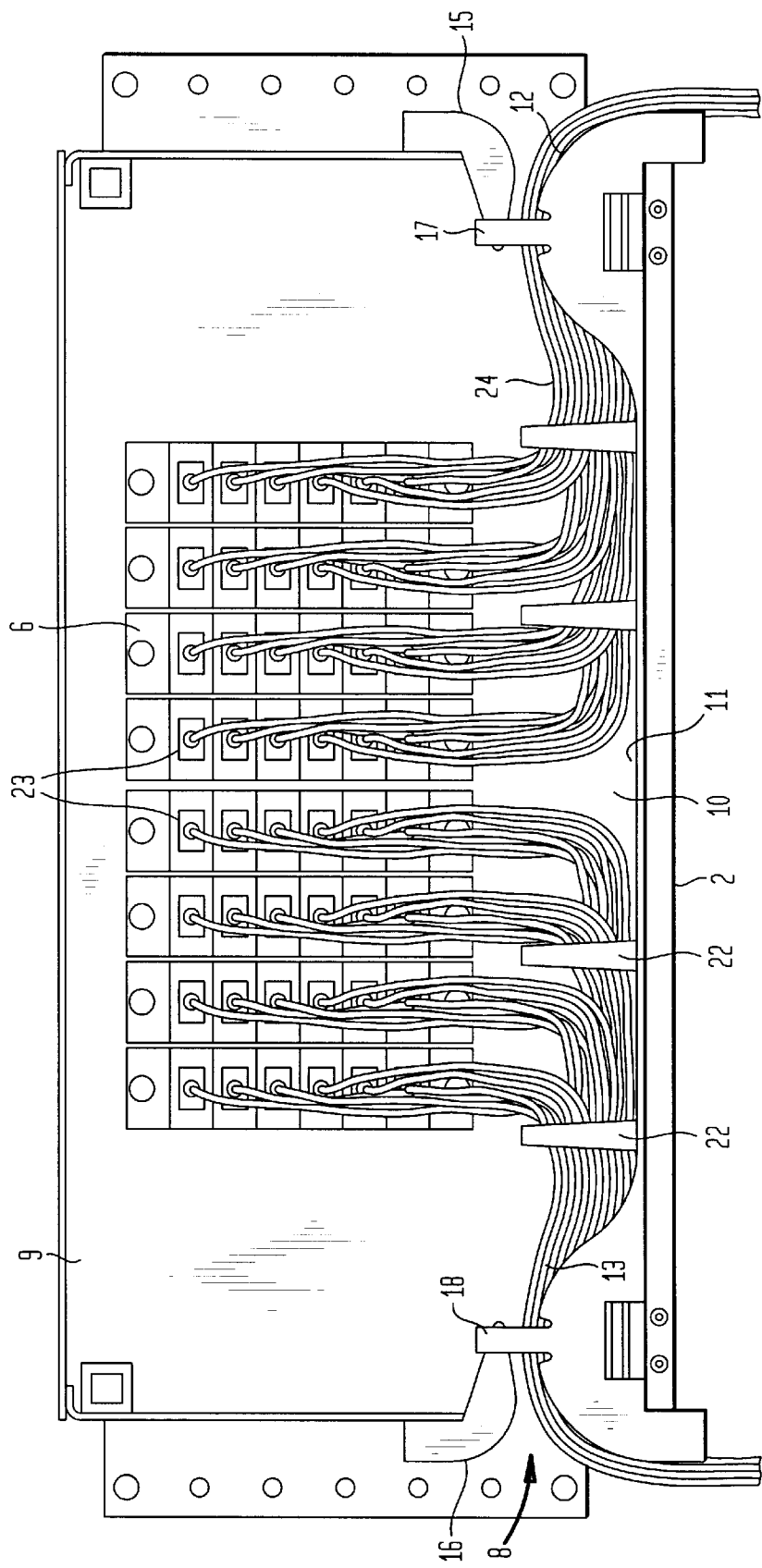
FIG. 3 is a front perspective view of a chamber of a fiber distribution shelf housing of the present invention, showing particularly the perspective of the radial guides of the invention being predominantly located within the perimeter of the shelf

FIG. 3 is a front perspective depiction of an illustrative embodiment of the invention, showing an overall perspective for the arrangement and routing of jumper cables within chamber (9) of the housing and the exiting of the cables from the chamber via the jumper ports of the shelf of the invention. The perspective is that of viewing the interior of the housing from outside the front door (which has been removed and is therefore not shown in the figure). FIG. 3 shows particularly the heretofore described characteristic of the radial guides of the invention as being located predominantly within the perimeter of the shelf.

As previously described in connection with FIG. 1, bulkhead panel (6) can be seen to include a plurality of optical connectors (23) into which optical fiber jumper cables (24) can be plugged. Left and right radial guides (12) and (13) can be seen at opposite ends of lower bend limiter/ringstand (10). As heretofore described, radial guides (12) and (13) prevent optical fiber jumper cables routed from chamber (9) to a vertical routing channel in the frame from being bent beyond a minimum bend radius. In a particular embodiment, left and right radial guide (12) and (13) prevent the bending of jumpers from exceeding a 38 mm bend limit.

Although no jumper cables are shown routed in the upward direction of the frame routing channel in the figure, the path for such a routing, via left and right upper radial guides (15) and (16) (which also form the upper portions of jumper ports (7) and (8)), will be apparent in FIG. 3. And, like radial guides (12) and (13), upper radial guides (15) and (16) prevent optical fiber jumper cables from exceeding the minimum bend radius as the cables transition from the shelf to the vertical routing channel of the frame.

FIG. 3 also shows an arrangement of fiber rings (22) deployed along the upper surface of base (2). As explained above, fiber rings (22) operate to collect and organize jumper cables (24) within chamber (9).

Figure 4:
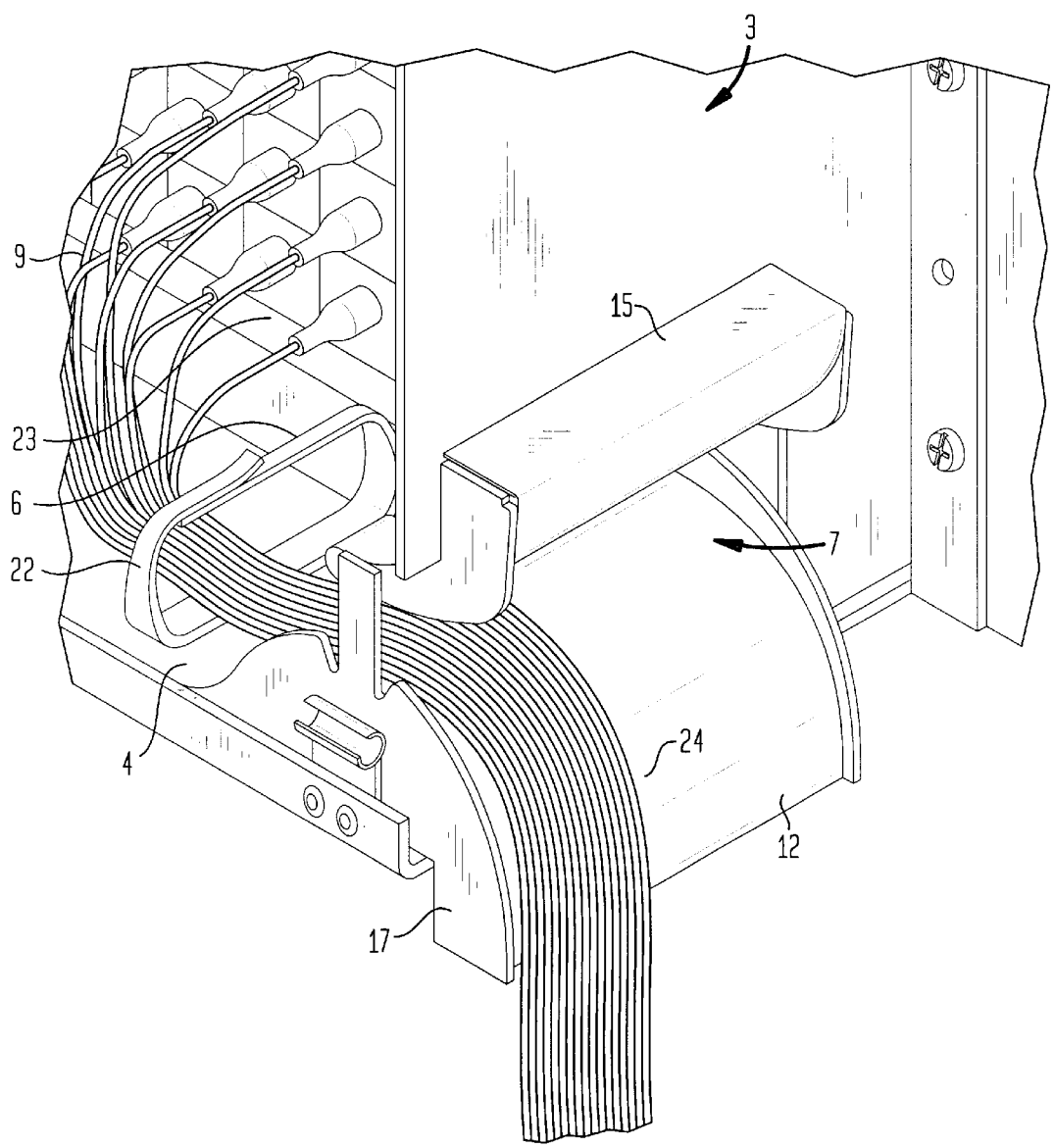
FIG. 4 is a perspective view of a fiber port of a fiber distribution shelf housing of the present invention.

FIG. 4 provides a perspective depiction of an illustrative embodiment of the invention showing a close-up perspective for one of the radial guides (12) and its companion upper radial guide (15), forming jumper port (7) of the housing of the invention. As can be seen in the figure, a portion of side panel (3) is removed to permit the placement of radial guide (12) and companion upper radial guide (15), forming jumper port (7). An enlarged perspective for one of the fiber rings (22) can also be seen in the figure, along with the distribution and handling arrangement for a portion of the jumper cables (24) that are plugged into optical connectors (23). Many other variations and modifications of the present invention will be apparent to those of ordinary skill in the art without departing from the spirit and scope of the present invention. The above-described embodiments are, therefore, intended to be merely exemplary, and all such variations and modifications are intended to be included within the scope of the invention as defined in the appended claims.

What is claimed is:

1. A fiber distribution shelf for use in a communication system distribution frame, comprising:
   a base having oppositely disposed first and second sides; and
   a first radial guide located on a surface of said base adjacent at least one of said first and second sides and arranged to form a radial protrusion above said base surface;
   wherein said first radial guide is disposed predominantly within a perimeter of said base, extending beyond said perimeter only to an extent needed to maintain a required bending radius for a 90 degree turn from said base;
   said first radial guide being operative to limit a bending radius of optical fiber jumper cables routed to or from said fiber distribution shelf.

2. The fiber distribution shelf of claim 1 further comprising a first upper radial guide disposed vertically above and substantially aligned with said first radial guide.

3. The fiber distribution shelf of claim 2 wherein said first radial guide and said first upper radial guide cooperatively define a first jumper port for routing of jumper cables to and from said shelf.

4. The fiber distribution shelf of claim 1 wherein said shelf further comprises:
   a second radial guide located on said surface of said base adjacent an opposite side from said at least one of said first and second sides and arranged to form a radial protrusion above said base surface;
   wherein said second radial guide is disposed predominantly perimeter of said base, extending beyond said perimeter only to an extent needed to maintain a required bending radius for a 90 degree turn from said base;
   said second radial guide being operative to limit a bending radius of optical fiber jumper cables routed to or from said fiber distribution shelf.

5. The fiber distribution shelf of claim 4 further comprising a second upper radial guide disposed vertically above and substantially aligned with said second radial guide.

6. The fiber distribution shelf of claim 5 wherein said second radial guide and said second upper radial guide cooperatively define a second jumper port for routing of jumper cables to and from said shelf.

7. The fiber distribution shelf of claim 1, further comprising one or more rings attached to said base surface, wherein optical fiber jumper cables on said shelf pass through said rings, and said rings organize, collect, and take up slack of said optical fiber jumper cables.

8. The fiber distribution shelf of claim 1, wherein said first and second radial guides are semi-cylindrical in shape.

9. A shelf jumper bend limiter housing comprising:
   (a) a base having a first end and a second end,
   (b) a connector panel comprising optical connectors into which optical fiber jumper cables can be plugged,
   (c) a first side panel and a second side panel, each having an area removed, wherein perimeters of said first and second side panels intersect perimeters of said base and a bulkhead panel, and said areas removed from said first and second side panels form apertures for first and second jumper ports on opposite sides of said base;
   (d) a top panel having a perimeter which intersects perimeters of said bulkhead panel and said first and second side panels, such that said bulkhead panel, said first and second, side panels, said base, and said top panel form a chamber,
   (e) a first upper bend limiter attached to said first side panel in said first jumper port above said first end of said base, and a second upper bend limiter attached to said second side panel in said second jumper port above said second end of said base; and
   (f) a fiber guide tray located on said base, wherein said fiber guide tray comprises:
      (i) a fiber ring mounting surface having a first end and a second end, (ii) a first radial guide located on said fiber ring mounting surface, wherein said first radial guide is arranged to form a radial protrusion above said fiber ring mounting surface and is disposed predominantly within a perimeter of said tray, extending beyond said perimeter only to an extent needed to maintain a required bending radius for a 90 degree turn from said tray, and (iii) a second radial guide located on said fiber ring mounting surface, wherein said second radial guide is arranged to form a radial protrusion above said fiber ring mounting surface and is disposed predominantly within said perimeter of said tray, extending beyond said perimeter only to an extent needed to maintain a required bending radius for a 90 degree turn from said tray, said first and second upper bend limiters and said first and second radial guides cooperatively forming said first and second jumper ports respectively, and being operative to limit a bending radius of optical fiber jumper cables routed to or from said fiber distribution shelf.

10. The shelf jumper bend limiter housing of claim 9, wherein said first and second radial guides are semi-cylindrical in shape.

11. The shelf jumper bend limiter housing of claim 9, wherein said upper bend limiters and said radial guides prevent bending of said jumpers from exceeding a 38 mm bend limit.

12. The shelf jumper bend limiter housing of claim 9, further comprising a first shoulder attached to said first radial guide that extends towards said first upper bend limiter, and a second shoulder attached to said second radial guide which extends towards said second upper bend limiter, and a front door having a perimeter which intersects the perimeters of said base, said first and second side panels, and said top panel, such that said chamber can be enclosed, and said first and second shoulders prevent said jumpers in said jumper ports from being pinched between the perimeter of said front door and said first and/or second side panels.

13. The shelf jumper bend limiter housing of claim 12, further comprising a hinge which connects said front door to said shelf, and permits said front door to be moved from an open position to a closed position, and vice versa.

14. A shelf jumper bend limiter housing comprising:

(a) a base having a first end and a second end;

(b) a connector panel comprising optical connectors into which optical fiber jumper cables can be plugged;

(c) a first side panel and a second side panel, each having an area removed, wherein perimeters of said first and second side panels intersect perimeters of said base and a bulkhead panel, and said areas removed from said first and second side panels form apertures for first and second jumper ports on opposite sides of said base;

(d) a top panel having a perimeter which intersects perimeters of said bulkhead panel and said first and second side panels, such that said bulkhead panel, said first and second side panels, said base, and said top panel form a chamber;

(e) a first upper bend limiter attached to said first side panel in said first jumper port above said first end of said base, and a second upper bend limiter attached to said second side panel in said second jumper port above said second end of said base; and (f) a fiber guide tray located on said base, wherein said fiber guide tray comprises:

(i) a fiber ring mounting surface having a first end and a second end;

(ii) a first radial guide located on said fiber ring mounting surface, wherein said first radial guide is arranged to form a radial protrusion above said fiber ring mounting surface and is disposed predominantly within a perimeter of said tray, extending beyond said perimeter only to an extent needed to maintain a required bending radius for a 90 degree turn from said tray, and (iii) a second radial guide located on said fiber ring mounting surface, wherein said second radial guide is arranged to form a radial protrusion above said fiber ring mounting surface and is disposed predominantly within said perimeter of said tray, extending beyond said perimeter only to an extent needed to maintain a required bending radius for a 90 degree turn from said tray, said first and second upper bend limiters and said first and second radial guides cooperatively forming said first and second jumper ports respectively, and being operative to limit a bending radius of optical fiber jumper cables routed to or from said fiber distribution shelf, said shelf jumper bend limiter housing further comprising a first shoulder attached to said first radial guide that extends towards said first upper bend limiter, and a second shoulder attached to said second radial guide which extends towards said second upper bend limiter, whereby, upon an attachment to said housing of a front door having a perimeter which intersects the perimeters of said base, said first and second side panels, and said top panel, such that, upon closing of said front door, said chamber can be enclosed, said first and second shoulders prevent said jumpers in said jumper ports from being pinched between the perimeter of said front door and said first and/or second side panels.

* * * * *